United States Patent [19]

Uchiyama

[11] Patent Number: 5,654,790
[45] Date of Patent: Aug. 5, 1997

[54] FOCUS STATE DETECTION DEVICE AND METHOD

[75] Inventor: Shigeyuki Uchiyama, Tokyo, Japan

[73] Assignee: Nikon Corporation, Tokyo, Japan

[21] Appl. No.: 488,897

[22] Filed: Jun. 12, 1995

[30] Foreign Application Priority Data

Jun. 29, 1994 [JP] Japan ................. 6-147775

[51] Int. Cl.$^6$ ..................... G03B 3/00
[52] U.S. Cl. ................. 396/123; 396/125
[58] Field of Search ............... 354/400–410

[56] References Cited

U.S. PATENT DOCUMENTS

| | | |
|---|---|---|
| 4,561,749 | 12/1985 | Utagawa . |
| 4,833,313 | 5/1989 | Akashi et al. ............... 354/404 |
| 4,914,282 | 4/1990 | Akashi et al. . |
| 4,977,311 | 12/1990 | Kusaka et al. . |
| 5,005,040 | 4/1991 | Norita et al. ............... 354/402 |
| 5,068,682 | 11/1991 | Utagawa . |
| 5,086,217 | 2/1992 | Ishida et al. ............... 354/408 |
| 5,150,146 | 9/1992 | Ueda et al. ............... 354/403 |
| 5,202,718 | 4/1993 | Uchiyama ............... 354/407 |
| 5,367,153 | 11/1994 | Suda et al. ............... 354/407 |
| 5,485,003 | 1/1996 | Kusada ............... 354/408 |

*Primary Examiner*—Safet Metjahic
*Assistant Examiner*—Michael Dalakis
*Attorney, Agent, or Firm*—Oliff & Berridge

[57] ABSTRACT

A focus state detection device accurately detects in a short period of time the defocus amount of an arbitrary subject even when a plurality of subjects having different photographic distances are intermixed within the focus state detection region. Normally, the defocus amount is calculated on the basis of electric signal strings from each of a plurality of blocks. However, if one of the blocks is a perspective conflict block in which are intermixed a plurality of subjects having different photographic distances, new blocks are established containing at least part of the perspective conflict block. The defocus amount is calculated on the basis of the electric signal strings corresponding to these new blocks.

31 Claims, 9 Drawing Sheets

FOCUS STATE DETECTION DEVICE AND METHOD

BACKGROUND OF THE INVENTION

1. Field of the Invention

The present invention relates to a focus state detection device used in a camera, video equipment or the like.

2. Description of Related Art

A focus state detection device is known that detects the focus adjustment state of the shooting lens in a camera, video equipment or the like.

FIG. 8 shows a focus state detection device employing the phase difference method. Light rays that are incident on the region 101 in the shooting lens 100 pass through a field of vision mask 200, a field lens 300, a diaphragm aperture 401 and a re-imaging lens 501 and are composed into an image on image sensor array A. On the image sensor array A, a plurality of photoelectric converter elements that generate an output corresponding to the intensity of the incident light are aligned in a one-dimensional manner. Similarly, light rays that are incident on the region 102 in the shooting lens 100 pass through a field of vision mask 200, a field lens 300, a diaphragm aperture 402 and a re-imaging lens 502 and are composed into an image on image sensor array B.

The two subject images formed on these image sensor arrays A and B are farther apart in the so-called front focus state, wherein the shooting lens 100 composes a clear image of the subject in front of the predicted focussing plane. Conversely, the images are closer together in the so-called back focus state, wherein the shooting lens 100 composes a clear image of the subject in back of the predicted focussing plane. At the so-called in-focus time when a clear image of the subject is formed precisely on the predicted focussing plane, the subject images on the image sensor arrays A and B relatively coincide.

Accordingly, by changing the pair of subject images into electrical signals through photoelectric conversion on the image sensor arrays A and B and by processing these signals to find the shift amount in the relative positions of the pair of subject images, it is possible to find the amount of difference from the focus adjustment stator, in-focus state, of the shooting lens 100. This difference is called the defocus amount. The direction of the shift is also ascertainable. The focus state detection region is the area of overlap near the predicted focussing plane of the image sensor arrays A and B as projected by the re-imaging lenses 501 and 502. As shown in FIG. 9 the focus state detection region is generally positioned in the center of the photo field.

Next, the conventional method of calculating the defocus amount will be described.

The image sensor arrays A and B are each composed of a plurality of photoelectric converter elements. The elements output a plurality of photoelectrically converted output signal strings a1–an and b1–bn as shown in FIGS. 10a and 10b. Furthermore, the pair of data strings undergoes a correlation algorithm while being shifted by a preset relative data amount L. Calling the maximum shift number lmax, the range of L is -lmax to +lmax. Specifically, the correlation amount C[L] is calculated using formula 1.

$$C[L]=\Sigma|a_i-b_j| \qquad (1)$$

Here, $\Sigma$ indicates the sum over $i=k$ to $r$. In addition, $j-i=L$, where $L=-lmax, \ldots, -1, 0, 1, \ldots, +lmax$.

The L in formula 1 is an integer corresponding to the shift amount in the data strings as described above. The first term k and the last term r are dependent upon the shift amount L and can be changed. The shift amount in the relative positions is the shift amount L when the pair of data strings coincides. Therefore, the shift amount L that gives the smallest correlation amount out of the correlation amounts C[L] is detected. The defocus amount is this shift amount multiplied by a constant found from the pitch width of the photoelectric converter elements in the image sensor array and the optical system shown in FIG. 8. However, the correlation amounts C[L] are widely dispersed values as shown in FIG. 10c, and the smallest unit of the defocus amounts that can be detected is limited by the pitch width of the photoelectric converter elements in the image sensor arrays A and B.

A method wherein precision focus state detection is performed by conducting an interpolation algorithm on the basis of the widely dispersed correlation amounts C[L], and through this calculating a new truly smallest value Cex, as disclosed by the present applicant in U.S. Pat. No. 4,561,749. This is a method wherein the true smallest value Cex and the shift amount Ls that corresponds to Cex are calculated from formulas 2 and 3 using correlation amount C[l], which is the smallest amount, and correlation amounts C[l+1] and C[l-1], which are the shift amounts to either side, as shown in FIG. 11.

$$DL=(C[l-1]-C[l+1])/2$$

$$Cex=C[l]-|DL|$$

$$E=MAX\{C[l+1]-C[l], C[l-1]-C[l]\} \qquad (2)$$

Here, MAX{Ca, Cb} means to select the larger of Ca and Cb.

$$Ls=l+DL/E \qquad (3)$$

Furthermore, the defocus amount DF is calculated from formula 4 using the shift amount Ls.

$$DF=Kf \times Ls \qquad (4)$$

Here, Kf is a constant found from the pitch width of the photoelectric converter elements in the image sensor arrays and focus state detection optical system shown in FIG. 8.

It is necessary to determine whether the defocus amount thus obtained represents the true defocus amount or is a result of fluctuation in the correlation amount caused by noise or the like. The defocus amount is deemed reliable when the condition shown in formula 5 is met.

$$E>E1 \text{ and } Cex/E<G1. \qquad (5)$$

Here, E1 and G1 are specific threshold values.

The numerical value E shows the condition of the change in the correlation amount. E depends on the contrast in the subject. The larger the value of E is, the higher the contrast and reliability. The smallest value Cex is the difference when the two data items most nearly coincide, and in the original state, Cex is 0. However, because of the effects of noise and furthermore because there is parallax between region 101 and region 102, as shown in FIG. 8, a minute difference is created between the pair of subject images, so the smallest value Cex does not become 0. Furthermore, because the effects of noise and the difference in subject images become smaller the larger the contrast in the subject is, Cex/E is used as the numerical value indicating agreement between the two data items. The closer Cex/E is to 0, the higher the reliability and the greater the agreement between the two data items. When a determination is made that reliability exists, driving of the shooting lens on the basis of the defocus amount DF, or a display, is conducted. Hereinafter, the correlation algorithm, the interpolation algorithm and the state determination together will be called the focus state detection algorithm.

With the above-described focus state detection device, however, problems arise when plural subjects having different photographic distances are composed into images on the image sensor arrays. For example, the case can be considered wherein a primary subject P and a background BL positioned far from one another are intermixed in the focus state detection region, as shown in FIG. 5a. When the shooting lens 100 is focussed on the background BL, the part of the pair of data items (A array data shown by the solid line, and B array data shown by the dotted line) corresponding to the pattern of the background BL coincides relatively well. However, a discrepancy is created in the part corresponding to the primary image P, as shown in FIG. 5b. Accordingly, a shift amount so that the pair of data items coincides does not exist. The smallest value Cex becomes a large value. Focus state detection is impossible because Cex/E does not satisfy the condition in formula 5.

In the present specification, when several subjects having different photographic distances are intermixed within the subject field, the resultant subject will be called a perspective conflict subject.

The focus state detection region is subdivided by dividing each of the two image sensor arrays into a plurality of blocks. The defocus amount Df is calculated by executing the focus state detection algorithm on each of these blocks. Furthermore, a focus state detection method is disclosed in U.S. Pat. No. 4,977,311 wherein the block with the defocus amount indicating the closest distance, for example, and the block with the maximum numerical value E are selected out of the plurality of blocks. The defocus amount of the block is set as a final defocus amount indicating the focus adjustment state of the shooting lens. Driving of the shooting lens is conducted in accordance with the final defocus amount.

In addition, in U.S. Pat. No. 4,914,282, a focus state detection method is disclosed, wherein detection is made to determine whether the subject is a perspective conflict subject. The focus state detection algorithm is executed in the entire focus state detection region in the case of a normal subject. In the case of a perspective conflict subject, the focus state detection region is divided into a plurality of blocks in order to execute the focus state detection algorithm. Here, dividing into blocks is conducted by making a plurality of groups of initial terms k and the final terms r for the shift amount L=0 in the correlation algorithm of above-described formula 1. For example, as shown in FIG. 7a, in order to execute the focus state detection algorithm by dividing the pair of image arrays each comprised of forty-six data items into five blocks each composed of eight data items, the correlation amount C[L] is calculated from formula 1 by setting k=4 and r=11 for the shift amount L=0 in block 1. The shift amount ls is calculated from formulae 2 and 3 on the basis of these values. The defocus amount DF is calculated from formula 4. Similarly, the focus state detection algorithm is executed in blocks 2, 3, 4 and 5 by setting k=12 and r=19, k=20 and r=27, k=28 and r=35, and k=46 and r=43, respectively, for the shift amount L=0. Alternatively, it is possible to create larger blocks in the same pair of image sensor arrays than in the case shown in FIG. 7a. For example, the arrays may be divided into three blocks each composed of fourteen data items with block 1 being k=3 to r=16, block 2 being k=17 to r=30 and block 3 being k=31 to r=44, as shown in FIG. 7b. Hereinafter, the initial term k and the final term r will be called the leading data number and the final data number of the block, respectively.

As shown in FIG. 5b, when the image sensor arrays are divided into six blocks 1–6, the pattern for the primary subject P exists only in block 3. Therefore, it is possible to obtain a defocus amount relative to the primary subject P by executing the focus state detection algorithm on the basis of the sensor output from the block 3. In addition, it is possible to obtain a defocus amount relative to the background BL because the pattern for the background BL exists in the other blocks.

In focus state detection devices that divide the focus state detection region into blocks, there is a method for changing the width of the blocks. This method includes executing the focus state detection algorithm first with narrow blocks until focus state detection is impossible in all of the blocks. Subsequently, the blocks are enlarged, and the focus state detection algorithm is again executed.

In addition, because there are cases wherein focus state detection becomes impossible because the contrast in the subject is positioned at the boundary of blocks, a method is disclosed in U.S. Pat. No. 5,068,682 wherein the absolute value of the difference between adjacent data items near the boundary of the block is calculated. The boundary position moves so that the boundary of the block is the area where the absolute value of the difference is smallest.

However, with the block division in the above-described focus state detection device, a problem arises that accurate focus state detection results cannot be obtained relative to perspective conflict subjects.

In the subject example shown in FIG. 5a, the focus state detection region shifts slightly to the left in the drawing when the photographer changes the composition. When this occurs, the pair of data items becomes as shown in FIG. 5c. The patterns for both the background BL and the primary subject P are intermixed in blocks 2 and 3. Because the subject in blocks 2 and 3 is a perspective conflict subject, it is impossible to obtain a defocus amount relative to the primary subject P.

In this way, through division of the focus state detection region into blocks, certain blocks achieve perspective conflict states, making focus state detection impossible, while conversely focus state detection becomes possible relative to a certain subject when the perspective conflict is resolved.

In order to solve this problem, a method has been considered wherein separate blocks 6–9 are added, which overlap two blocks each out of the division into blocks 1–5. The focus state detection algorithm is executed in all blocks 1–9, and focus state detection is prevented from becoming impossible through perspective conflict. Additionally, a method has also been considered wherein focus state detection is prevented from becoming impossible through perspective conflict by making the block division finer.

However, the former method has the disadvantage that the volume of the focus state detection algorithm is increased by the number of added blocks, while the latter method has the disadvantage that the precision of the focus state detection algorithm drops because the number of data items from the image sensor arrays that comprise the blocks becomes smaller.

SUMMARY OF THE INVENTION

It is an object of the present invention to provide a focus state detection device and method that accurately detect in a short period of time the defocus amount of an arbitrary subject even when plural subjects having different photographic distances are intermixed within the focus state detection region.

This and other objects of the invention are achieved by providing a focus state detection device including a focus state detection optical system that composes a pair of subject images from a pair of light rays passed through the shooting lens. A pair of photoelectric converter element arrays composed of a plurality of photoelectric converter elements output a pair of electrical signal strings by converting the light intensity of the pair of subject images into electrical signals at each photoelectric converter element. A focus state detection computation device divides the pair of electric signal strings output from the pair of photoelectric converter element arrays into a plurality of blocks. The computation device then calculates the defocus amount indicating the focus adjustment state of the shooting lens on the basis of the electrical signal strings from each of these blocks.

The focus state detection device may include a perspective conflict determination device that determines for each block whether the block is a perspective conflict block, on the basis of the electric signal string from each block. A perspective conflict occurs when plural subjects having different photographic distances are present in the same block. After the perspective conflict determination device has determined that one of the blocks (e.g., block 3) is a perspective conflict block, the focus state detection computation device establishes new blocks (3' and 3") containing at least part of the perspective conflict block (3). Finally, a computation device calculates the defocus amount on the basis of the electric signal string corresponding to these new blocks 3' and 3".

An embodiment of the focus state detection device may be provided in which the new blocks 3' and 3" are smaller than the perspective conflict block (3).

The device may further include a contrast detection device that detects areas with relatively high contrast within a perspective conflict block (3) on the basis of the electric signal string from the perspective conflict block (3). The focus state detection device establishes new blocks that contain the high contrast areas detected by the contrast detection device. The new blocks are smaller than the perspective conflict block (3). The computation device calculates the defocus amount on the basis of electric signal strings corresponding to these new blocks.

In yet another embodiment, the focus state detection computation device establishes new blocks 3.1–3.3 at and around the perspective conflict block (3) that are smaller than the perspective conflict block (3). The computation device calculates the defocus amount on the basis of the electric signal strings corresponding to these new blocks 3.1–3.3.

The invention further achieves the above object through application to a method of focus state detection.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

An embodiment of the focus state detection device according to the present invention as applied to a camera will now be described.

Figure 1:
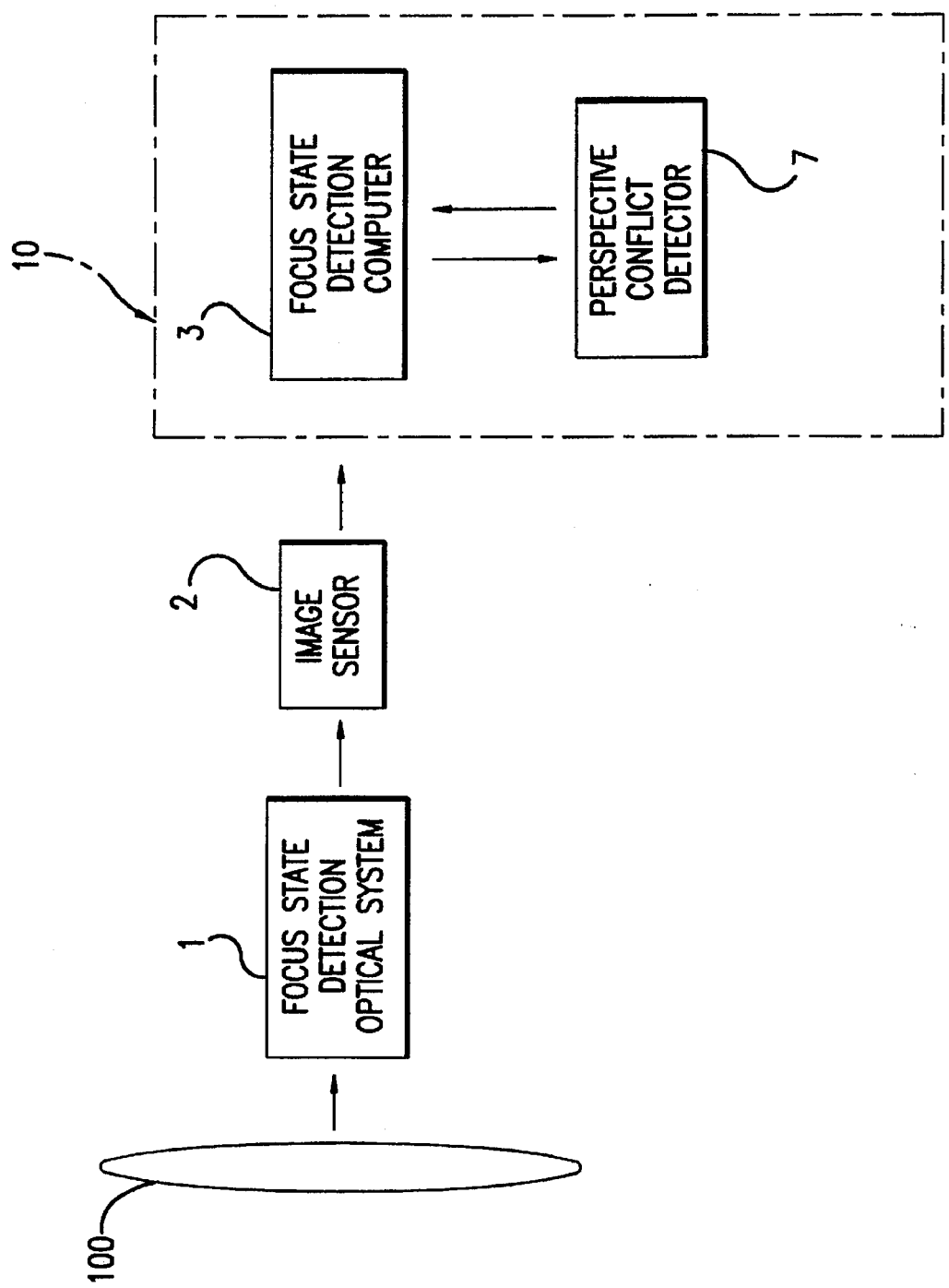
FIG. 1 is a function block diagram showing the configuration of an embodiment.
Figure 7A:
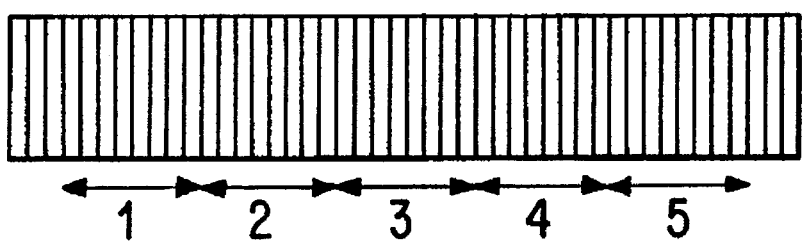
FIG. 7 is a drawing showing an example of block division in the focus state detection region.
Figure 7B:
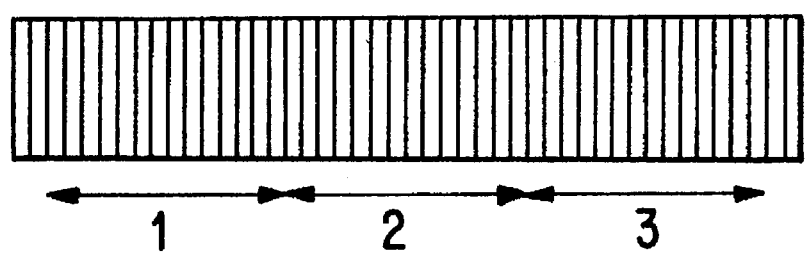
Figure 8:
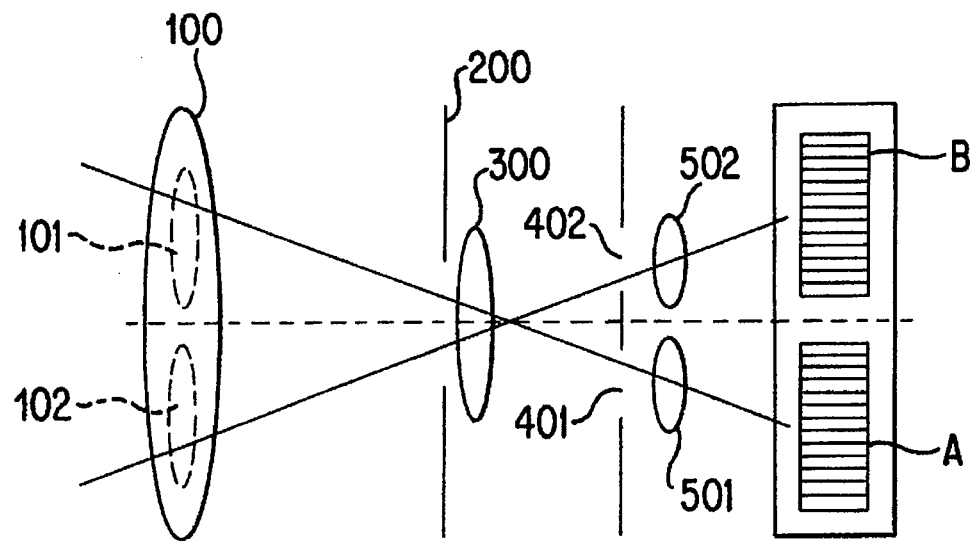
FIG. 8 is a drawing showing the configuration of a focus state detection optical system.
Figure 9:
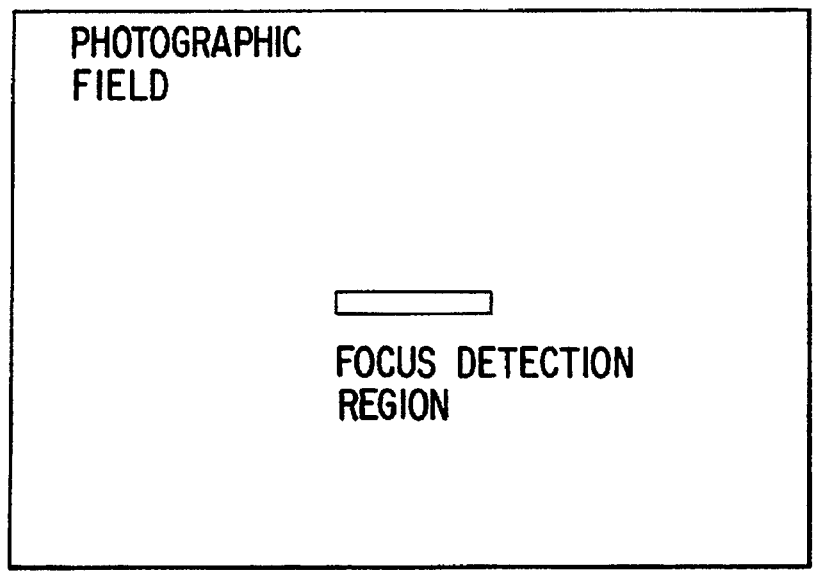
FIG. 9 is a drawing showing the focus state detection region.
Figure 10A:
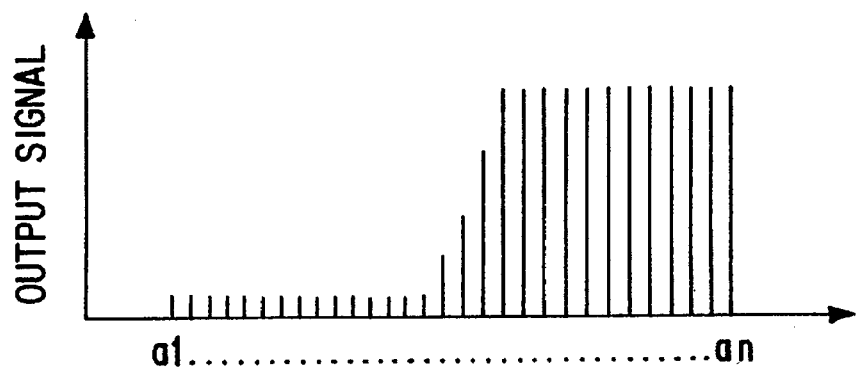
FIG. 10 is a drawing illustrating the focus state detection algorithm.
Figure 10B:
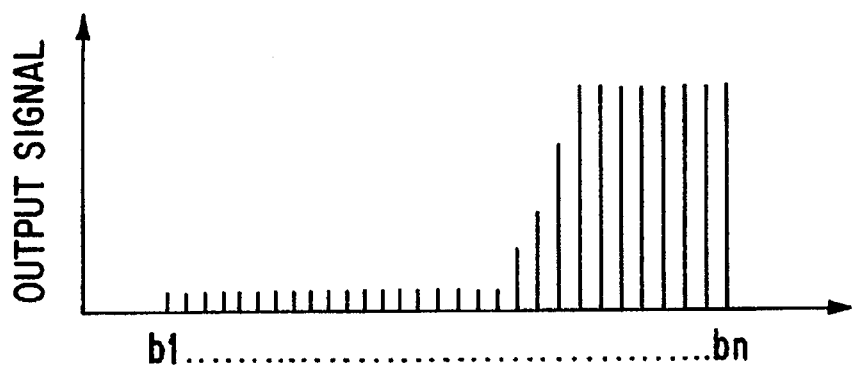
Figure 10C:
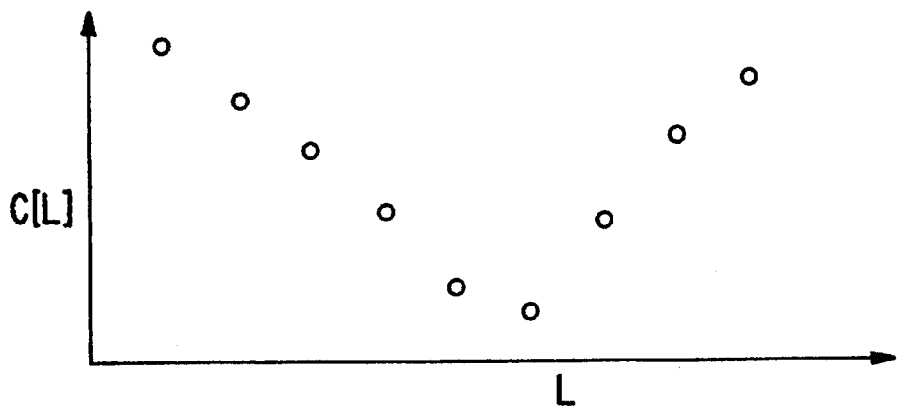
Figure 11:
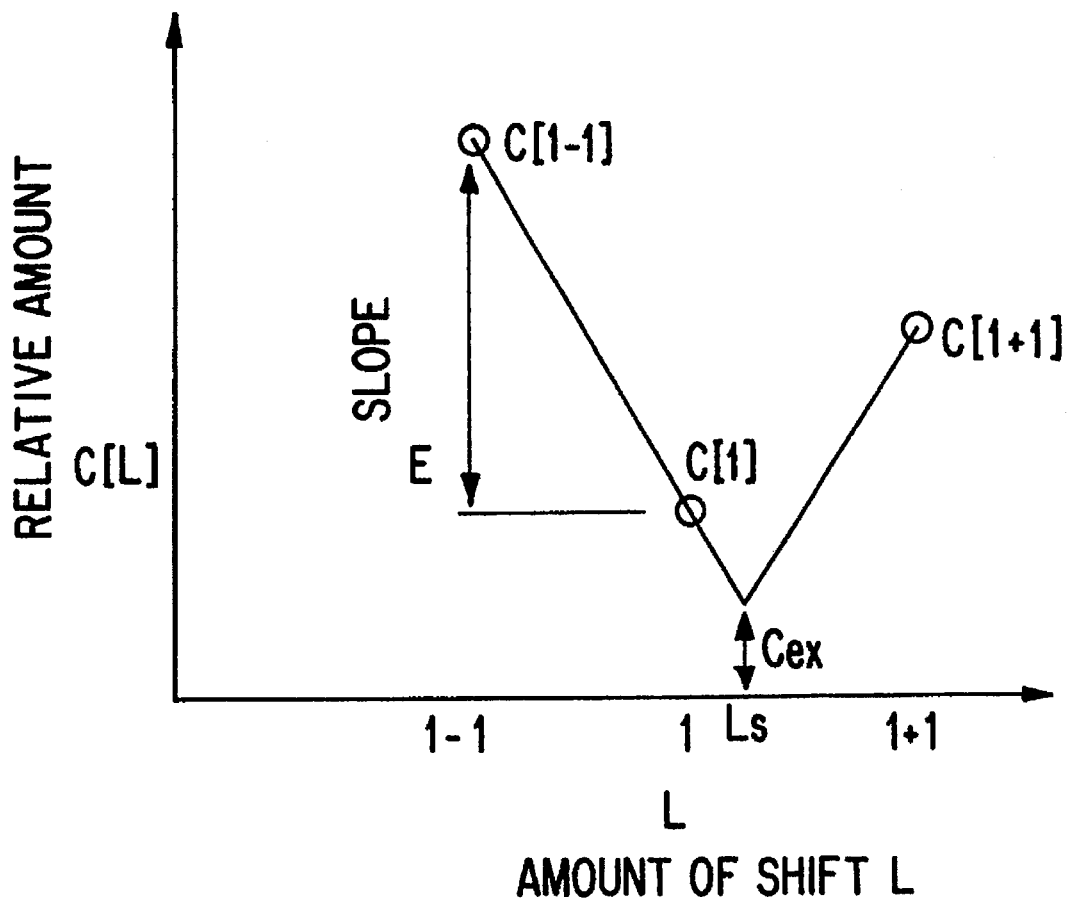
FIG. 11 is a drawing illustrating the focus state detection algorithm.

FIG. 1 shows the configuration of this embodiment. The focus state detection optical system 1 includes the field of vision mask 200, field lens 300, diaphragm apertures 401 and 402, and re-imaging lenses 501 and 502 shown in FIG. 8. Light rays used in focus state detection that have passed through the shooting lens 100 are conducted to the image sensor 2 and are formed into a pair of secondary images. The image sensor 2 has a pair of image sensor arrays composed of a plurality of photoelectric converter elements. The image sensor outputs a focus state detection signal corresponding to the distribution of the light intensity in the pair of secondary images of the subject. Each of the two image sensor arrays in the image sensor 2 is composed of 46 photoelectric converter elements as shown in FIG. 7a, and the photoelectric converter elements are divided into five blocks composed of eight photoelectric converter elements each. Because one photoelectric converter element corresponds to one pixel in the subject image, hereinafter the photoelectric converter elements will also be called pixels. The focus state detection computer 3 conducts A/D conversion on the focus state detection signal output from the image sensor 2 and calculates the focus adjustment state of the shooting lens 100 on the basis of the resultant data string. The perspective conflict detector 4 detects perspective conflicts in the subject on the basis of the results of calculations performed by the focus state detection computer 3.

The focus state detection computer 3 and the perspective conflict detector 4 are comprised of a microcomputer 10, which also has peripherals including an A/D converter and a memory, which execute below-described programs and focus state detection algorithms, and conduct perspective conflict detection and perspective conflict block detection.

Figure 2:
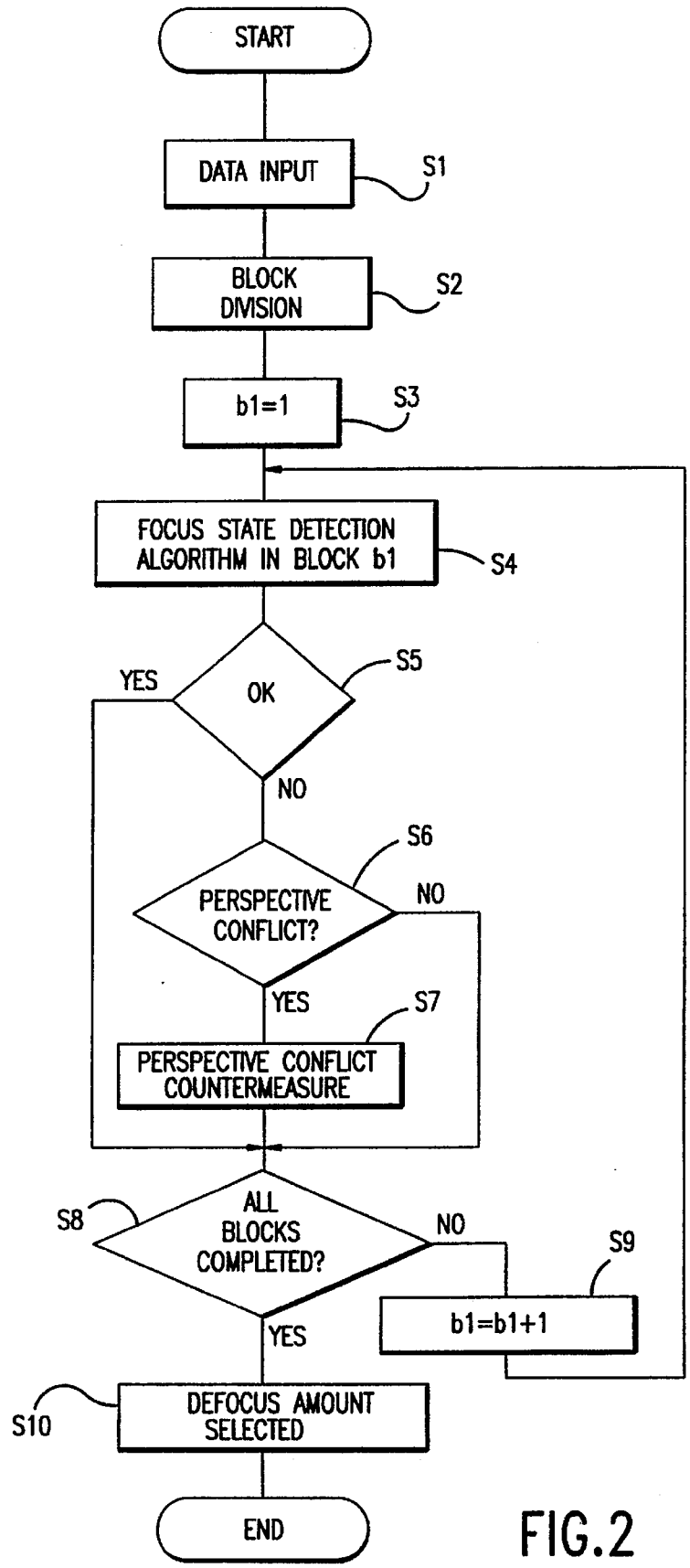
FIG. 2 is a flowchart showing the control program of the microcomputer, which comprises the focus state detection computer and the perspective conflict detector.

FIG. 2 is a flowchart showing the control program executed by the microcomputer 10. A description of the actions of the present embodiment is presented hereafter, with reference to the flowchart.

When a shutter release button (not shown) is depressed halfway, the microcomputer 10 begins to execute the control program. In step S1 after execution has started, the focus state detection signal is input from the image sensor, and a pair of subject image data strings is created through A/D conversion. In step S2, the data strings are divided into a plurality of blocks as shown in FIG. 7a. In step S3, parameter b1 is set equal to one, to indicate the block number when the focus state detection algorithm is performed. In step S4, the focus state detection algorithm is performed using above-described formulae 1–4 on the block b1. Subsequently, in step S5, a determination is made as to whether focus state detection is possible using formula 5. When detection is possible, the microcomputer moves to step S8. When detection is impossible, the microcomputer moves to step S6. When focus state detection is impossible, the microcomputer makes the determination in step S6 whether block b1 is a block containing a perspective conflict subject. If this block is a perspective conflict block, the microcomputer moves to step S7. Otherwise the microcomputer moves to step S8.

As described above, in the case of a perspective conflict subject, the degree of agreement between the pair of subject image data strings declines, and the smallest value Cex in formulae 2 and 3 becomes a large value. As a result, focus state detection becomes impossible because Cex/E becomes larger than threshold value G1. In other words, when Cex/E is in a preset range being at least as large as preset value G1 while being smaller than preset value G2, there is a strong possibility that a perspective conflict subject is present. Accordingly, the determination that a block is a perspective conflict block is made when the following equations are satisfied.

$$E > E1, \text{ while } G2 > Cex/E \geq G1 \qquad (6)$$

In step S7, countermeasures to perspective conflict are executed. Details of these perspective conflict countermeasures are described below. In step S8, if parameter b1 is 5, the microcomputer moves to step S10 because focus state detection algorithms relative to all blocks have been completed. If parameter b1 is not 5, the microcomputer moves to step S9. In step S9, the parameter b1 is incremented to execute focus state detection algorithms for the next block, and the microcomputer then returns to step S4 and repeats the above-described actions. When focus state detection algorithms relative to all blocks have been completed, the computer moves to step 10. In step S10, the final defocus amount is set. This setting method could be, for example, setting the final defocus amount to be the defocus amount showing the closest distance, the defocus amount closest to being in-focus, or the average value of the defocus amounts.

Step S6 in the above-described control program is a process of the perspective conflict detector 4, while the other steps are processes of the focus state detection computer 3.

Next, details of the perspective conflict countermeasures in step S7 of the above-described control program will be explained.

Figure 3A:
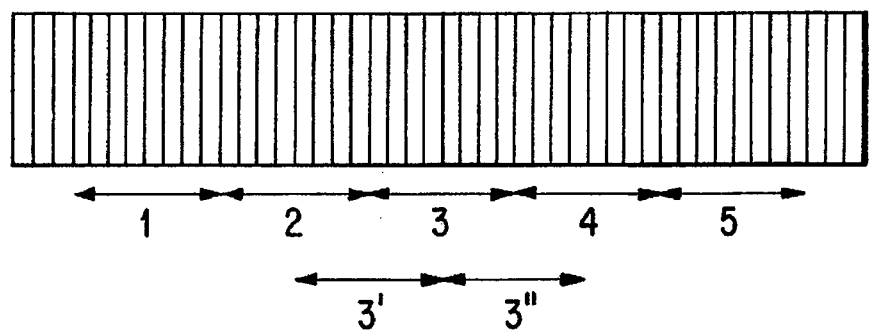
FIG. 3 is a drawing showing an example of block division in an embodiment.

In a first example of perspective conflict countermeasures, new blocks are established that overlap both the perspective conflict block and the adjacent blocks. The focus state detection algorithm is performed on these new blocks. For example, when block 3 is a perspective conflict block as shown in FIG. 3a, block 3' is established, which overlaps both the perspective conflict block 3 and the adjacent block 2, and block 3" is established, which overlaps both the perspective conflict block 3 and the adjacent block 4. The focus state detection algorithm is performed with formulae 1–5 relative to these new blocks 3' and 3". Furthermore, when a reliable defocus amount is obtained from both new blocks 3' and 3", the defocus amount showing the closest distance, for example, or the defocus amount in which the above-described numerical value E is largest is selected from these defocus amounts and is set as the defocus amount of block 3. On the other hand, when a reliable defocus amount can be obtained from only one of the new blocks 3' and 3", this defocus amount is set as the defocus amount of block 3.

Figure 7C:
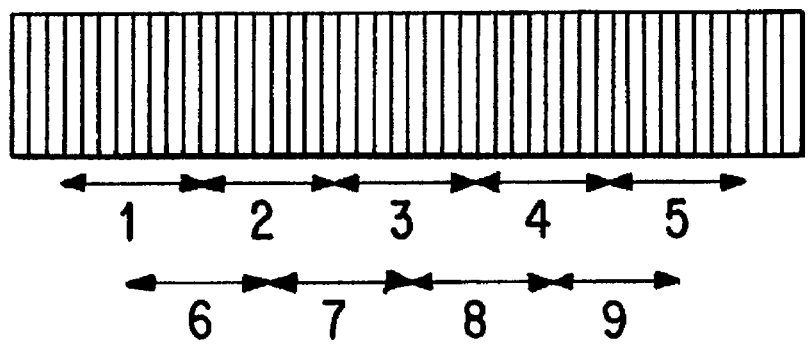

When it is clear that a perspective conflict subject is present in block 3 as a result of the focus state detection algorithm being performed on the block divisions 1–5, the defocus amount for block 3 can also be obtained by another method. The defocus amount where the perspective conflict subject is present can also be obtained from the method, as shown in FIG. 7c, wherein blocks 6–9 are newly established, and the focus state detection algorithm is again performed on these blocks. The defocus amount can be calculated in the perspective conflict block using either method. The current example differs in that the number of blocks in which focus state detection algorithms are performed decreases because blocks 3' and 3" are established for perspective conflict countermeasure only relative to perspective conflict block 3, and focus state detection is therefore possible in a length of time that is shorter.

If the width of the newly established blocks, which overlap both the perspective conflict block and the adjacent blocks, is made smaller than the width of the perspective conflict block, the probability that focus state detection will be possible in these newly established blocks is further increased.

Figure 3B:
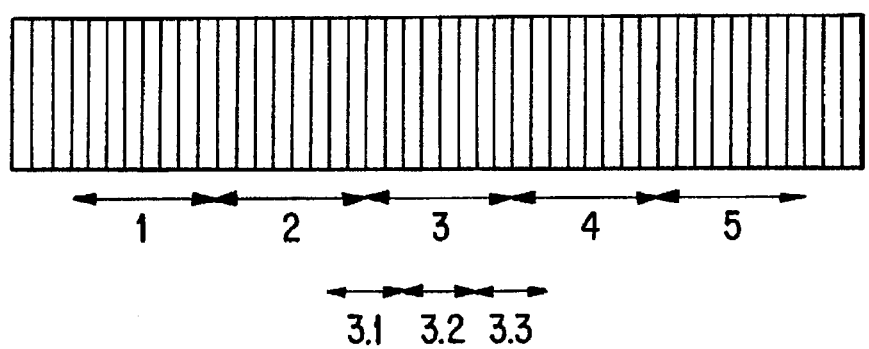

In a second countermeasure example, the perspective conflict block and surrounding areas are divided into a plurality of blocks having more narrow width, and the focus state detection algorithm is performed on these blocks. For example, as shown in FIG. 3b, when block 3 is the perspective conflict block, three blocks 3.1, 3.2 and 3.3 are established in the vicinity of block 3. Blocks 3.1, 3.2 and 3.3 are each comprised of 4 data items, forming half the normal block width. The focus state detection algorithm is performed on each of these blocks using formulae 1–5. The defocus amount showing the closest distance, for example, or the defocus amount in which the above-described numerical value E is largest is selected from among the defocus amounts obtained and is set as the defocus amount of block 3.

With this second perspective conflict countermeasure example, if a perspective conflict subject is not present in any of the blocks, a highly precise defocus amount is obtained because focus state detection algorithms are performed in blocks of normal width. When a perspective conflict subject is present, the defocus amount of the perspective conflict block can be detected because the focus state detection algorithm is performed on finer divisions of the perspective conflict block.

In a third countermeasure example, new blocks having narrow width are established that include the areas where the subject pattern contrast is high within the perspective conflict block. The focus state detection algorithm is performed on these new blocks using formulae 1–5. In many cases, the boundary between the patterns for the background and the primary subject has an edge pattern with a relatively strong contrast because there is in general a difference in brightness between the primary subject and the background. The defocus amount relative to the primary subject can be obtained by executing the focus state detection algorithm on these edge pattern areas.

Figure 4:
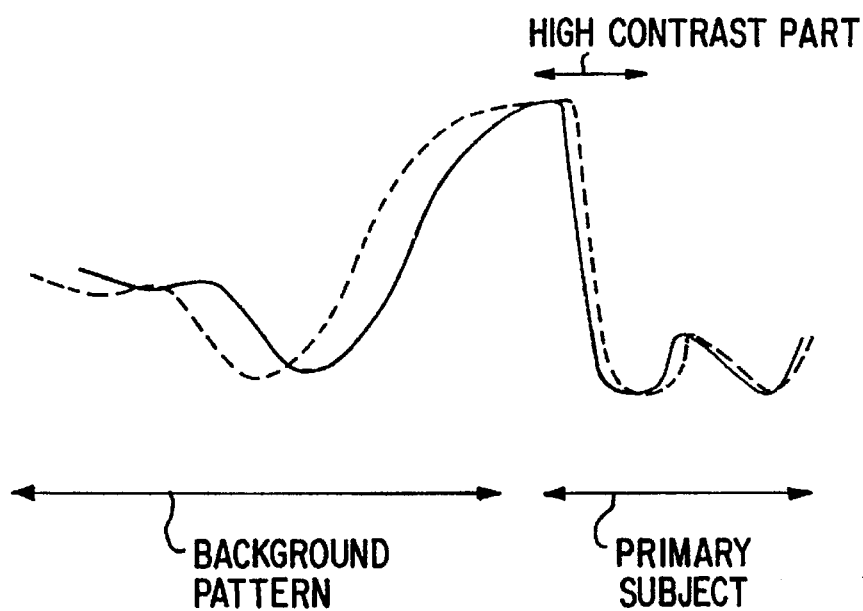
FIG. 4 is a drawing showing the subject pattern in a perspective conflict block.
Figure 5A:
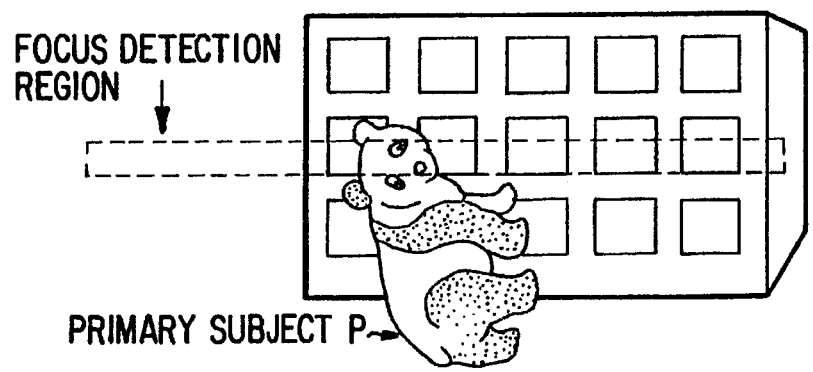
FIG. 5 is a drawing explaining block division of the subject and focus state detection region.
Figure 5B:
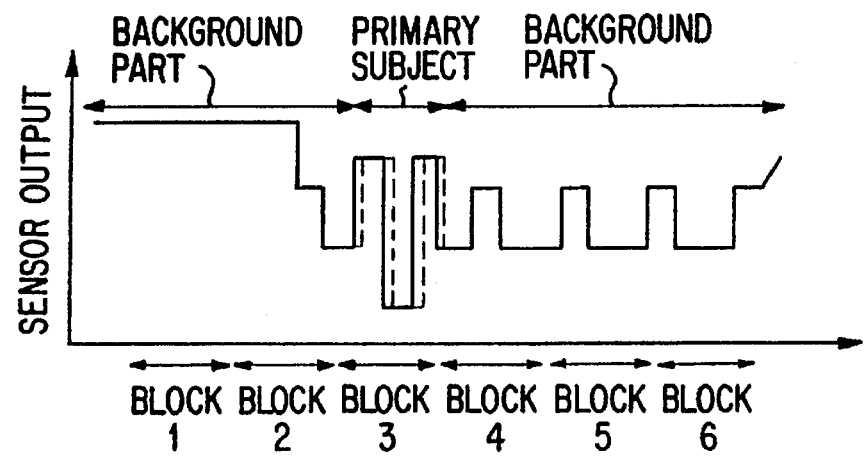
Figure 5C:
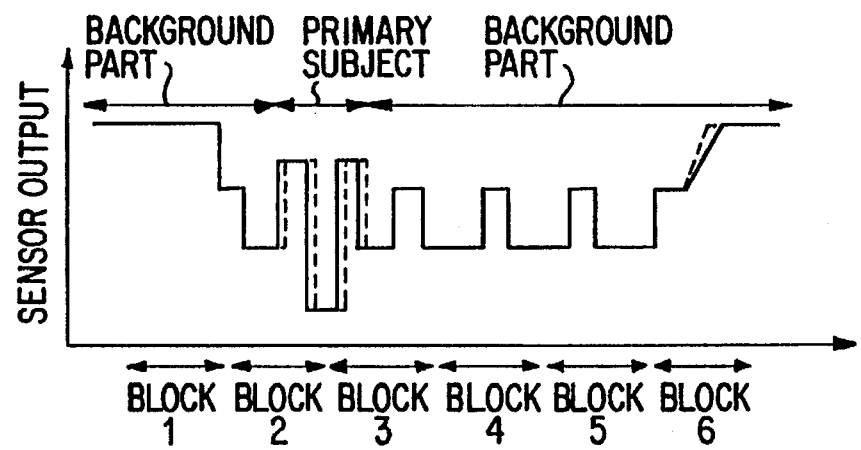

FIG. 4 shows an example of the subject pattern in the perspective conflict block. In this figure the portion to the left side is the pattern of the background, while the portion to the right side is the pattern of the primary subject, and the boundary between the two is an edge pattern with strong contrast. In other words, an edge pattern is extracted when areas with high contrast within the perspective conflict block are extracted. The defocus amount relative to the primary subject can be detected if focus state detection algorithms are performed on these areas. Even when the boundary between the patterns for the background and the primary subject is a strong edge pattern, a block that extracts the pattern of the primary subject can be established if the contrast of the primary subject is higher than that of the background. It is then possible to detect the defocus amount relative to the primary subject.

Figure 6:
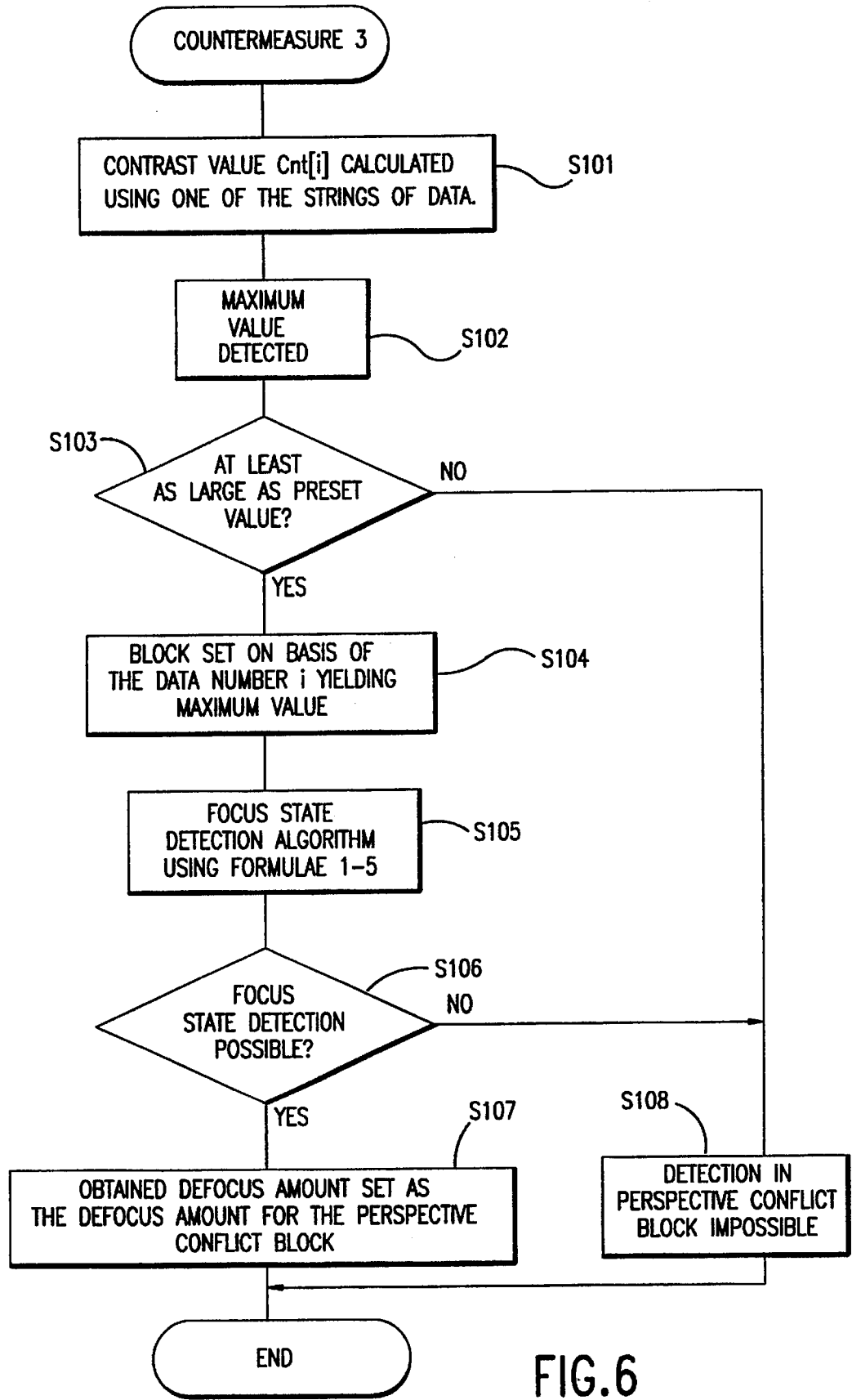
FIG. 6 is a flowchart showing the control program of the third example of perspective conflict countermeasures.

FIG. 6 is a flowchart showing the control program of the third example of perspective conflict countermeasures. This flowchart will be used to explain the steps of the third example of perspective conflict countermeasures.

In step S101, the contrast value Cnt[i] in the perspective conflict block is computed using the following formula relative to one of the data strings output by the pair of image sensor arrays.

$$Cnt[i]=|Da[i+k-1]-Da[i+k-1+N]| \qquad (7)$$

Here, i=1 to (r−k+1−N), Da is one of the data strings out of the pair of data strings from the image sensor 2, k is the leading data number, r is the final data number, and N is an integer no smaller than 1 (preferably in the range 1–4).

In step S102, the maximum out of the obtained contrast values Cnt[i] is detected. In the following step S103, a determination is made as to whether the detected maximum value is at least as large as a preset value. When the maximum value is at least as large as the preset value, the microcomputer moves to step S104 to conduct the focus state detection algorithm. If the maximum value is not as large as the preset value, the microcomputer moves to step S108 because the determination is that the focus state detection algorithm is impossible.

In step S104, a new block is established on the basis of the data number i that yielded the maximum contrast value Cnt[i]. For example, when Cnt[i] becomes a maximum at data number i=I, blocks of 6 data items are established when N=3, and the leading data number k' and the final data number r' of the new blocks are established as follows.

$$k'=I+k-2$$
$$r'=k'+5 \qquad (8)$$

In step S105, the correlation amount is calculated using the k' and r' obtained in above-described step S104 as the k and r in formula 1, and furthermore, the focus state detection algorithm is conducted using formulae 2–4. In step S106, a determination is made as to whether focus state detection is possible with formula 5. If focus state detection is possible, the microcomputer moves to step S107. When focus state detection is not possible the microcomputer moves to step S108. In step S107 the obtained defocus amount is set as the defocus amount for the perspective conflict block. On the other hand, in step 108, when focus state detection is impossible, detection in the perspective conflict block is considered impossible.

With this third example of perspective conflict countermeasures, a highly precise defocus amount can be obtained when a perspective conflict subject is not present in any of the blocks. In this case the focus state detection algorithm is performed on blocks of normal width. When a perspective conflict subject is present, only one new block of width more narrow than normal is established in this perspective conflict block. Therefore, fewer additions are made to the volume of the focus state detection algorithm than in the above-described first and second countermeasure examples.

With this third example of perspective conflict countermeasures, the contrast value within the perspective conflict block is detected relative to one data string from the pair of image sensor arrays. It would also be appropriate to detect the contrast value in the perspective conflict block relative to both data strings and to select one of the results.

In addition, it would also be appropriate to establish a new block on the basis of one of the data strings out of the pair of data strings and to establish a separate new block on the basis of the other data string out of the pair of data strings. Thereafter the focus state detection algorithm would be conducted on the two new blocks, and one of these defocus amounts would be selected. Alternatively, the focus state detection algorithm could be conducted on a new block established on the basis of one of the data strings out of the pair of data strings. When a reliable defocus amount cannot be obtained, a separate new block could be established on the basis of the other data string out of the pair of data strings. Subsequently, the focus state detection algorithm could be executed on the separate new block.

Each of the above-described examples is intended to be illustrative and not limiting relative to the number of focus state detection regions, the number of blocks into which each focus state detection region is divided and the method of division.

In the structure of the above-described embodiment, the focus state detection optical system 1 comprises the focus state detection optical system. The image sensor arrays in the image sensor 2 comprise the photoelectric converter element arrays. The microcomputer 10 comprises the focus state detection computation means, the perspective conflict determination means and the contrast detection means.

With the above-described invention, normally the defocus amount is calculated on the basis of electrical signal strings for each predetermined block, but when one of the blocks is a perspective conflict block in which are intermixed a plurality of subjects having different photograph distances, new blocks are established that contain at least part of the perspective conflict block. The defocus amount is calculated on the basis of the electrical signal strings corresponding to these new blocks. Therefore, it is possible to accurately detect in a short period of time the defocus amount of an arbitrary subject even when a plurality of subjects having different photographic distances are intermixed within the focus state detection region.

In addition, if one of the blocks is a perspective conflict block, new blocks are established that include the relatively high contrast areas of the perspective conflict block and are smaller than the perspective conflict block. The defocus amount is calculated on the basis of the electrical signal strings corresponding to these new blocks. Therefore, it is possible to accurately detect in a short period of time the defocus amount of an arbitrary subject even when a plurality of subjects having different photographic distances are intermixed within the focus state detection region.

Furthermore, if one of the blocks is a perspective conflict block, new blocks are established at and around the perspective conflict block that are smaller than the perspective conflict block, the defocus amount being calculated on the basis of the electric signal strings corresponding to these new blocks. Therefore, it is possible to accurately detect in a short period of time the defocus amount of an arbitrary subject even when a plurality of subjects having different photographic distances are intermixed within the focus state detection region.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A focus state detection device comprising:

an optical system including a shooting lens receiving light rays, the optical system composing a subject image;

an image sensor including a pair of photoelectric converter arrays each including a plurality of photoelectric converter elements arranged to convert light intensity of the subject image to a corresponding pair of electrical signal strings;

a controller for analyzing the electrical signal strings and dividing the pair of electrical signal strings into a plurality of blocks, including a focus state detection circuit for detecting a focus condition on the basis of the electrical signal strings from each of blocks and a perspective conflict detector determining for each block whether the block is a perspective conflict block;

a new block establishing device that establishes at least one new block containing at least part of the perspective conflict block on the basis of a result of said perspective conflict detector; and a calculating device that calculates a defocus amount based on electrical signal strings from the new blocks.

2. The focus state detection device according to claim 1, wherein the at least one new block is smaller than said perspective conflict block.

3. The focus state detection device according to claim 2, wherein said at least one new block includes exactly three new blocks overlapping with each perspective conflict block.

4. The focus state detection device according to claim 3, wherein said at least one new block is half of the normal block width.

5. The focus state detection device according to claim 2, wherein said at least one new block includes exactly two new blocks overlapping with each perspective conflict block.

6. The focus state detection device according to claim 1, further comprising a contrast detection device that detects areas with high contrast within a perspective conflict block on the basis of an electrical signal string from the perspective conflict block.

7. The focus state detection device according to claim 6, wherein the new block establishing device establishes at least one new block containing the high contrast areas detected by said contrast detection device.

8. The focus state detection device according to claim 7, wherein said at least one new block is smaller than the perspective conflict block.

9. The focus state detection device according to claim 7, wherein a calculating device calculates the defocus amount on the basis of the electrical signal strings corresponding to said at least one new block.

10. The focus state detection device according to claim 6, wherein the contrast detection device detects a contrast value relative to both electrical signal strings.

11. A focus state detection device comprising:

a focus state detection optical system for composing a pair of subject images from a pair of light rays passed through a shooting lens;

image sensing means having a pair of photoelectric converter arrays including, means for converting light intensity of said pair of subject images into electrical signals, and means for outputting a pair of electrical signal strings based on said electrical signals;

a computation means including;

means for dividing said electrical signal strings into a plurality of blocks;

means for calculating a defocus amount indicating the focus adjustment state of the shooting lens on the basis of the electrical signal strings from each of said blocks;

perspective conflict determination means for determining if each of said blocks is a perspective conflict block on the basis of the electrical signal strings from each of said blocks;

means for establishing at least one new block for each perspective conflict block, said new block containing at least part of the perspective conflict block; and means for calculating the defocus amount on the basis of the electrical signal string corresponding to said at least one new block.

12. The focus state detection device according to claim 11, wherein the at least one new block is smaller than the perspective conflict block.

13. The focus state detection device according to claim 12, wherein said at least one new block includes exactly three new blocks overlapping with each perspective conflict block.

14. The focus state detection device according to claim 13, wherein each said at least one new block is half of the normal block width.

15. The focus state detection device according to claim 12, wherein said at least one new block includes exactly two new blocks overlapping with each perspective conflict block.

16. The focus state detection device according to claim 11, further comprising a contrast detection means that detects an area with high contrast within a perspective conflict block on the basis of the electrical signal string from the perspective conflict block.

17. The focus state detection device according to claim 16, wherein new block establishing means establishes a new block containing the high contrast area of each perspective conflict block detected by said contrast detection means.

18. The focus state detection device according to claim 17, wherein the at least one new block is smaller than the perspective conflict block.

19. The focus state detection device according to claim 17, wherein a calculating means calculates the defocus amount on the basis of the electrical signal strings corresponding to each said at least one new block.

20. The focus state detection device according to claim 16, wherein the contrast detection means detects a contrast value relative to both electrical signal strings.

21. A focus state detection method comprising the steps of:

forming a pair of subject images by passing light rays through a shooting lens;

converting the light intensity of said subject images into electrical signal strings;

dividing the electrical signal strings into a plurality of blocks;

calculating a defocus amount based on the electrical signal strings in each of said blocks;

determining from the electrical signal strings for each of said blocks whether one of said blocks is a perspective conflict block;

establishing at least one new block containing at least part of the perspective conflict block for each perspective conflict block detected; and calculating the defocus amount based on electrical signal strings corresponding to the at least one new block.

22. The focus state detection method according to claim 21, wherein the step of establishing the at least one new block includes establishing a new block that is smaller than said perspective conflict block.

23. The focus state detection method according to claim 22, wherein the step of establishing the at least one new block includes establishing exactly three new blocks overlapping with each perspective conflict block.

24. The focus state detection method according to claim 23, wherein each said at least one new block is half of the normal block width.

25. The focus state detection method according to claim 22, wherein the step of establishing at least one new block includes establishing exactly two new blocks overlapping with each perspective conflict block.

26. The focus state detection method according to claim 21, further comprising the step of detecting an area with high contrast within a perspective conflict block on the basis of an electrical signal string from the perspective conflict block.

27. The focus state detection method according to claim 26, further comprising the step of establishing at least one new block containing the high contrast area detected by said contrast detection device.

28. The focus state detection method according to claim 27, wherein said at least one new block is smaller than the perspective conflict block.

29. The focus state detection method according to claim 27, further comprising the step of calculating the defocus amount on the basis of the electrical signal strings corresponding to said at least one new block.

30. The focus state detection method according to claim 26, wherein the step of detecting areas with high contrast includes detecting a contrast value relative to both electrical signal strings.

31. A focus state detection device comprising:

a focus state detection optical system that composes a pair of subject images from a pair of light rays that have passed through a shooting lens;

a pair of photoelectric converter element arrays composed of a plurality of photoelectric converter elements, the arrays outputting a pair of electrical signal strings by converting light intensity of the pair of subject images composed by said focus state detection optical system into electrical signals at each of the photoelectric converter elements;

a focus state detection computation device that divides the pair of electric signal strings output from the pair of photoelectric converter element arrays into a plurality of blocks, said focus state detection computation device calculating a defocus amount on the basis of the electrical signal strings from each of said blocks; and a perspective conflict determination device that determines for each of said blocks whether the block is a perspective conflict block on the basis of the electric signal strings from each of said blocks, wherein after the perspective conflict determination device has determined that one of the blocks is a perspective conflict block, the focus state detection computation device establishes at least one new block containing a least part of the perspective conflict block, and calculates the defocus amount on the basis of an electric signal string corresponding to said at least one new block.

* * * * *